United States Patent
Tsujino et al.

(10) Patent No.: US 7,598,973 B2
(45) Date of Patent: Oct. 6, 2009

(54) LINE HEAD AND IMAGE FORMING APPARATUS INCORPORATING THE SAME

(75) Inventors: Kiyoshi Tsujino, Nagano (JP); Yujiro Nomura, Nagano (JP); Ken Ikuma, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 183 days.

(21) Appl. No.: 11/182,523

(22) Filed: Jul. 14, 2005

(65) Prior Publication Data

US 2006/0012670 A1 Jan. 19, 2006

(30) Foreign Application Priority Data

Jul. 16, 2004 (JP) ............................ P2004-209313
May 13, 2005 (JP) ............................ P2005-140755

(51) Int. Cl.
*B41J 2/45* (2006.01)
(52) U.S. Cl. ...................................... 347/238
(58) Field of Classification Search ................ 347/116, 347/234–238, 246–250, 122, 130, 229; 355/1; 399/49
See application file for complete search history.

(56) References Cited

U.S. PATENT DOCUMENTS

| | | | | |
|---|---|---|---|---|
| 4,478,504 A | * | 10/1984 | Tanaka ........................ 355/1 |
| 5,138,338 A | * | 8/1992 | Mochizuki et al. .......... 347/237 |
| 5,300,961 A | * | 4/1994 | Corona et al. ............... 347/116 |
| 5,719,680 A | | 2/1998 | Yoshida et al. |
| 5,778,280 A | * | 7/1998 | Komiya et al. ................ 399/49 |
| 6,321,060 B1 | * | 11/2001 | Nakayasu et al. ........... 399/301 |
| 6,603,495 B2 | * | 8/2003 | Hayakawa ................... 347/116 |
| 6,844,888 B2 | * | 1/2005 | Nakamura ................... 347/138 |
| 2001/0033323 A1 | | 10/2001 | Otose et al. |
| 2004/0174426 A1 | * | 9/2004 | Nomura et al. ............. 347/238 |

FOREIGN PATENT DOCUMENTS

| | | |
|---|---|---|
| EP | 0618078 A2 | 10/1994 |
| EP | 1 510 351 | 3/2005 |
| JP | 63-278074 | 11/1988 |
| JP | 03-272873 | 12/1991 |
| JP | 06302855 A | 10/1994 |
| JP | 07156442 A | 8/1995 |
| JP | 07-304211 | 11/1995 |
| JP | 09234906 A | 9/1997 |
| JP | 2003-112442 | 4/2003 |
| JP | 2004098317 A | 4/2004 |
| WO | 03101743 | 12/2003 |

* cited by examiner

*Primary Examiner*—Hai C Pham
(74) *Attorney, Agent, or Firm*—Hogan & Hartson LLP

(57) ABSTRACT

A plurality of first light emitters are arrayed on the substrate in a first direction so as to form a light emitter array. Each of the first light emitters has a first dimension in the first direction. A plurality of second light emitters are arrayed on the substrate in the first direction. Each of the second light emitters has a second dimension in the first direction which is larger than the first dimension.

18 Claims, 17 Drawing Sheets

| BIT DATA NO. | BIT DATA | | | | | | | | GRADATION LEVEL |
|---|---|---|---|---|---|---|---|---|---|
| 1 | 0 | 0 | 0 | 0 | 0 | 0 | 0 | 0 | 0 |
| 2 | 0 | 0 | 0 | 0 | 0 | 1 | 0 | 0 | 4 |
| 3 | 0 | 0 | 0 | 0 | 1 | 0 | 0 | 0 | 8 |
| 4 | 0 | 0 | 0 | 1 | 0 | 0 | 0 | 0 | 16 |
| 5 | 0 | 0 | 1 | 0 | 0 | 0 | 0 | 0 | 32 |
| 6 | 0 | 1 | 0 | 0 | 0 | 0 | 0 | 0 | 64 |
| 7 | 1 | 0 | 0 | 0 | 0 | 0 | 0 | 0 | 128 |
| 8 | 1 | 1 | 1 | 1 | 1 | 1 | 1 | 1 | 255 |

LINE HEAD AND IMAGE FORMING APPARATUS INCORPORATING THE SAME

BACKGROUND OF THE INVENTION

The present invention relates to a line head and an image forming apparatus incorporating the same.

In general, a toner image former using an electrophotographic method comprises a photosensitive member serving as an image carrier having a photosensitive layer on an outer peripheral face, a charger for uniformly charging the outer peripheral face of the photosensitive member, an exposer for selectively exposing the outer peripheral face charged uniformly by the charger to form an electrostatic latent image, and a developing device for giving a toner serving as a developer to the electrostatic latent image formed by the exposer, thereby forming a visible image (a toner image).

In an image forming apparatus using a tandem method which forms a color image, a plurality of (for example, four) toner image former is provided on an intermediate transfer belt. Some apparatuses are of an intermediate transfer belt type which sequentially transfers toner images formed on a photosensitive member by monochromatic toner image former onto an intermediate transfer belt and superposes toner images having a plurality of colors (for example, yellow, cyan, magenta and black) on the intermediate transfer belt, thereby obtaining a full color image on the intermediate transfer belt.

Moreover, there has been known a color image forming apparatus comprising an image carrier constituted to freely carry an electrostatic latent image thereon, a rotary developing unit and a line head. In the image forming apparatus, the rotary developing unit carries, on a face thereof, toners accommodated in a plurality of toner cartridges and rotates in a predetermined rotating direction, thereby delivering the toners having different colors to an opposed position to the image carrier sequentially. Then, a developing bias is applied between the image carrier and the rotary developing unit to move the toner from the rotary developing unit to the image carrier. By such a processing, the electrostatic latent image is revealed to form a toner image.

There has been known an image forming apparatus using the tandem method or a rotary method in which an LED (light emitting diode) or an organic EL (electroluminescence) element is used as a light emitter in a line head. In some cases, the line head having such a structure is attached with a tilt with respect to a reference position in a primary scanning direction. In FIG. 21, (a) shows a state in which the line head is placed in a reference attachment position which is parallel with the primary scanning direction, (b) shows a state in which the attachment is carried out with a tilt corresponding to several dots in an upward direction in the drawing, and (c) shows a state in which the attachment is carried out with a tilt corresponding to several dots in a downward direction in the drawing.

As described above, when the line head is attached with a tilt with respect to the reference position in the primary scanning direction, a density fluctuation is generated so that the quality of an image is deteriorated. Moreover, there is a problem in that a color deviation is generated and a desirable color reproduction cannot be carried out in the formation of a color image. In order to prevent a deterioration in an image from being caused by the tilt of the line head, various proposals for detecting the tilt of the line head have been made. For example, in Japanese Patent Publication No. 63-278074A, an image signal generator for forming a test pattern image, to be used for a test measurement, on a transfer belt for each color and the test pattern image is detected by a detector.

In the technique described in the Japanese Patent Publication No. 63-278074A, the test pattern is generated and is input from an outside to an image forming apparatus. Moreover, it is necessary to hold the test pattern as stored data in a controller provided in the image forming apparatus. For this reason, a great deal of time and labor is required for creating the test pattern, and furthermore, the structure of the controller in the image forming apparatus is complicated and the tilt of a line head cannot be detected easily.

Japanese Patent Publication No. 3-272873A discloses the correction of a tilt in a case where an EL element of an end face light emission type is used for the line head. In this example, the width of a primary scanning line is divided into a plurality of portions so that the light emission timing is adjusted for each of the divided portions in order to correct the tilt of the line head.

Japanese Patent Publication No. 7-304211A discloses the correction of the tilt of an LED head. In this example, tilt correction data are added to image data for each dot and the corrected data are output to a recording head, thereby correcting the tilt of the LED head.

In the technique described in Japanese Patent Publication No. 3-272823A, a writing operation is always started in the same timing for each light emitter array corresponding to each divided portion in order to simplify the circuit structure and the correction control. Therefore, it is impossible to perform the tilt correction adjustment with respect to an arbitrary number of light emitters. In the technique described in Japanese Patent Publication No. 7-404211A, furthermore, the amount of the correction of a tilt is based on a unit of a primary scanning line. Therefore, there is a problem in that a fine control cannot be carried out.

SUMMARY OF THE INVENTION

It is therefore an object of the invention to provide a line head and an image forming apparatus incorporating the same, capable of easily detecting the tilt of the line head.

In order to achieve the above object, according to the invention, there is provided a line head, comprising:
  a substrate;
  a plurality of first light emitters, arrayed on the substrate along a first line extending in a first direction so as to form a light emitter array, each of the first light emitters having a first dimension in the first direction;
  a first driver, operable to drive the first light emitters; and
  a plurality of second light emitters, arrayed on the substrate along a second line extending in the first direction, each of the second light emitters having a second dimension in the first direction which is larger than the first dimension.

With this configuration, an image formed by the second light emitters can be used as a test pattern for detecting a tilt of the line head.

Preferably, the first line and the second line situate different positions as to a second direction which is perpendicular to the first direction. In this case, the space on the substrate can be efficiently used.

Alternatively, the first line and the second line situate an identical position as to a second direction which is perpendicular to the first direction. In this case, the first light emitters and the second light emitters can be fabricated on the substrate in the same process.

Preferably, the second light emitters are disposed in both end portions of the substrate in the first direction. In this case, the free space on the substrate can be efficiently used.

Preferably, the second light emitters are disposed inside a region defined by lines extending in a second direction which is perpendicular to the first direction while passing through light emitters situated at both ends of the light emitter array. In this case, there is less restriction regarding the positions of the second light emitters because the region is originally prepared for the formation of the light emitters.

Alternatively, the second light emitters are disposed outside a region defined by lines extending in a second direction which is perpendicular to the first direction while passing through light emitters situated at both ends of the light emitter array. In this case, the image formation by the second light emitters will not disturb the image formation by the first light emitters.

Preferably, the first light emitters include organic electroluminescence elements. Since the organic electroluminescence elements can be controlled statically, the control system of the line head can be simplified Preferably, the first driver includes a thin film transistor circuit. In this case, the first light emitters and the thin film transistor circuit can be fabricated on the substrate in the same process, thereby reducing manufacturing costs.

Preferably, the first driver is operable to drive the second light emitters. In this case, the first driver can be efficiently used. In addition, the substrate can be downsized.

Alternatively, the line head further comprises a second driver operable to drive the second light emitters. In this case, the image formation by the second light emitters can be performed at an arbitrary timing.

According to the invention, there is also provided an image forming apparatus incorporating the above line head, comprising:

an image carrier, moved in the second direction so that a first electrostatic latent image is formed thereon by light emitted from the first light emitters and a second electrostatic latent image is formed thereon by light emitted from the second light emitters;

a developing device, supplying toner onto the image carrier to develop the first electrostatic latent image as a first visible toner image and to develop the second electrostatic latent image as a second visible toner image; and a detector, detecting a deviation of a position of the second visible toner image from a reference position to determine a tilt of the line head from a reference attitude.

With this configuration, the quality deterioration of an obtained image due to the tilt of the line head can be easily avoided.

Preferably, the image forming apparatus further comprises a controller operable to delay an emission start timing of at least one of the first light emitters in accordance with the determined tilt. In this case, the quality deterioration of an obtained image due to the tilt of the line head can be avoided by simply adding correction data for delaying the emission start timing.

Here, it is preferable that: the light emitter array is divided into a plurality of blocks each including a plurality of the first light emitters; and the controller collectively controls the emission start timing for the first light emitters in each of the blocks. This control is suitable for reproducing a natural picture.

It is further preferable that the emission start timings of first light emitters situating in the vicinity of a border between adjacent ones of the blocks are subjected to processing to reduce a difference between the emission start timings thereof. In this case, a fine image can be obtained.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Figure 17:
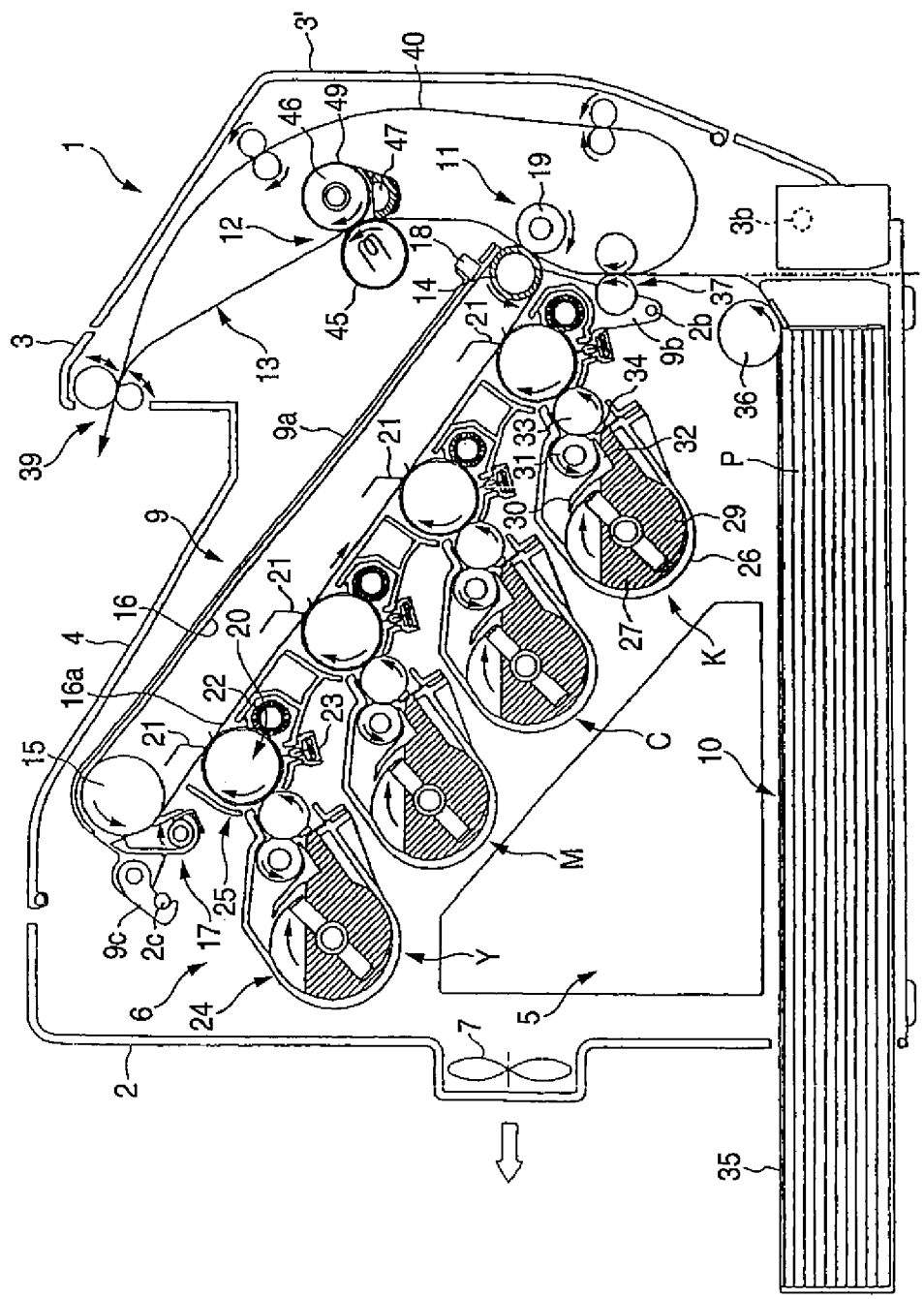
FIG. 17 is a schematic section view of a first example of an image forming apparatus incorporating the line head.

FIG. 17 shows a tandem-type image forming apparatus 1 incorporating a line head according to a first embodiment of the invention. In this embodiment, an organic EL element is used as a light emitter. The image forming apparatus comprises four line heads having the same structures that EL elements are arrayed are provided in association with four corresponding photosensitive drums (image carriers) having the same structures.

The image forming apparatus 1 comprises a housing body 2, a first door member 3 attached to the front face of the housing body 2, and a second door member (serving also as a sheet ejection tray) 4 attached to the upper face of the housing body 2. Furthermore, the first door member 3 includes a door cover 3' attached to the front face of the housing body 2, and the door cover 3' can be opened and closed interlockingly with or independently from the first door member 3.

The housing body 2 includes an electrical equipment box 5 having a power circuit board and a processor board therein, an image forming unit 6, a ventilation fan 7, a transfer belt unit 9, and a sheet feeding unit 10. At the inside of the first door member 3, a secondary transfer unit 11, a fuser unit 12 and a sheet transporter 13 provided therein. Articles of consumption in the image forming unit 6 and the sheet feeding unit 10 have structures which can be attached to and removed from a body, and they can be removed including the transfer belt unit 9 and can be repaired or exchanged in that case.

The first door member 3 is attached to the housing body 2 through a shaft 3b on both sides in the lower part of the front face of the housing body 2. Each of the units can be attached and removed in access from only the front face of the apparatus. The transfer belt unit 9 includes a driving roller 14 provided in the lower part of the housing body 2 and rotated by a driving source which is not shown, a follower roller 15 provided obliquely above the driving roller 14, an intermediate transfer belt 16 laid between the two rollers 14 and 15 and circulated in the direction of an arrow in the drawing, and cleaner 17 adapted to be retractably abutted against the intermediate transfer belt 16. The driving roller 14 and the follower roller 15 are rotatably supported on a support frame 9a and a pivot center 9b is formed on the lower end of the support frame 9a, and the pivot center 9b is fitted with a pivot shaft 2b provided on the housing body 2. Consequently, the support frame 9a Is pivotably attached to the housing body 2.

Moreover, a lock lever 9c is pivotably provided on the upper end of the support frame 9a and can be engaged with an engagement shaft 2c provided in the housing body 2. The driving roller 14 also serves as a back-up roller for a secondary transfer roller 19 to constitute the secondary transfer unit 11. In addition, the follower roller 15 is also caused to serve as a back-up roller for the cleaner 17. The cleaner 17 is arranged so as to be abutted against a part 16a of the intermediate transfer belt 16 facing downward.

Furthermore, a primary transfer member 21 formed by a leaf spring electrode is caused to abut on the back face of the part 16a of the intermediate transfer belt 16 by its elastic force opposite to an image carrier 20 for each of image forming stations Y, M, C and K which will be described below, and a transfer bias is applied to the primary transfer member 21. A test pattern sensor 18 is provided on the support frame 9a of the transfer belt unit 9 close to the driving roller 14. The test pattern sensor 18 serves to position a toner image having each color on the intermediate transfer belt 16 and to detect the density of the toner image having each color, thereby correcting the color deviation of the image having each color and the density of the image. A detector for detecting a test pattern to determine the tilt of a line head which will be described below can be provided in an arbitrary position on the face of the intermediate transfer belt 16.

The image forming unit 6 includes the image forming stations Y (for yellow), M (for magenta), C (for cyan) and K (for black) for forming images having a plurality of (four in this embodiment) different colors, and each of the image forming stations Y, M, C and K has the image carrier 20 formed by a photosensitive drum, and a charger 22, an image writer (line head) 23 and a developing device 24 which are provided around the image carrier 20. The charger 22, the image writer 23 and the developing device 24 have the reference numerals for only the image forming station Y, and the other reference numerals are omitted because the other image forming stations have the same structures. Moreover, the order of the arrangement of the image forming stations Y, M, C and K is arbitrary.

The image carrier 20 of each of the image forming stations Y, M, C and K is caused to abut on the part 16a of the intermediate transfer belt 16 facing downward. As a result, the image forming stations Y, M, C and K are also provided in an inclined direction to a left side in the drawing with respect to the driving roller 14. The image carrier 20 is rotated in the circulating direction of the intermediate transfer belt 16 as shown in an arrow in the drawing. The charger 22 is constituted by a conductive brush roller connected to a high voltage source and the outer periphery of a brush abuts and rotates in a reverse direction to the image carrier 20 at a double to triple circumferential speed, thereby charging the surface of the image carrier 20 uniformly.

The image writer 23 uses an organic EL element array in which organic EL elements are arranged in a line in the axial direction of the image carrier 20 as will be described below. A line head using the organic EL element array has an advantage that it has a smaller optical path length and size than a laser scanning optical system, and can be provided close to the image carrier 20, and the size of the whole apparatus can be reduced. In this embodiment, the image carrier 20, the charger 22 and the image writer 23 of each of the image forming stations Y, M, C and K are formed into a unit as one image carrier unit 25. These units can be exchanged together with the transfer belt unit 9. In the exchange of the image carrier unit 25, the members are exchanged including the line head 23.

Next, the developing device 24 will be described in detail on behalf of the image forming station K. In this embodiment, each of the image forming stations Y, M, C and K is provided in an oblique direction and a toner container 26 is provided with an obliquely downward tilt because the image carrier 20 is to abut on the part 16a of the intermediate transfer belt 16 facing downward. For this reason, a special structure is employed for the developing device 24. More specifically, the developing device 24 has the toner container 26 for storing a toner (a hatching portion in the drawing), a storage space 27 formed in the toner container 26, an agitator 29 provided in the storage space 27, and a partition member 30 formed in the upper part of the storage space 27.

Moreover, there are a toner supply roller 31 provided above the partition member 30, a blade 32 provided on the partition member 30 and abutting on the toner supply roller 31, a developing roller 33 provided to abut on the toner supply roller 31 and the image carrier 20, and a control blade 34 which is caused to abut on the developing roller 33. The image carrier 20 is rotated in the circulating direction of the intermediate transfer belt 16, and the developing roller 33 and the supply roller 31 are rotated in a reverse direction to the rotating direction of the image carrier 20 as shown in an arrow in the drawing, while the agitator 29 is rotated in a reverse direction to the rotating direction of the supply roller 31.

Moreover, the sheet feeding unit 10 includes a sheet feeding cassette 35 in which recording sheets P are laminated and held, and a pick-up roller 36 for feeding the recording sheets P from the sheet feeding cassette 35 one by one. At the inside of the first door member 3, there are provided a resist roller pair 37 for defining the sheet feeding timing of the recording sheets P to a secondary transfer portion, the secondary transfer unit 11 which is pressed in contact with the driving roller 14 and the intermediate transfer belt 16, the fuser unit 12, the sheet transporter 13, a sheet ejection roller pair 39, and a transporting path 40 for double-sided printing.

The fuser unit 12 has a heating roller 45 which includes a heating element such as a halogen heater and is rotatable, a pressing roller 46 being pressed against the heating roller 45, a belt stretcher 47 pivotably provided on the pressing roller 46, and a heat-resistant belt 49 laid between the pressing roller 45 and the belt stretcher 47. A color image transferred secondarily onto the recording sheet is fused to the recording sheet at a predetermined temperature in a nip portion formed by the heating roller 45 and the heat-resistant belt 49.

Figure 18:
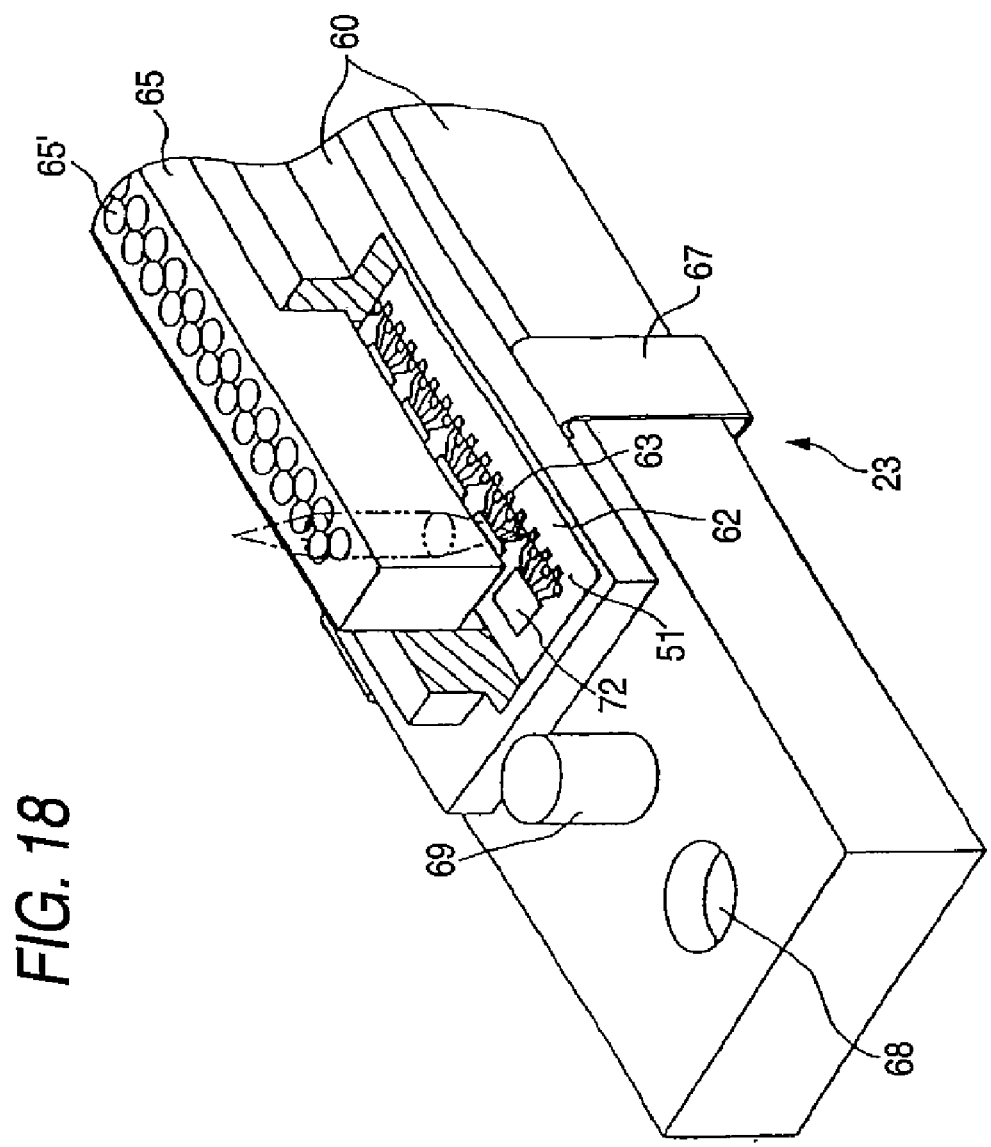
FIG. 18 is a perspective view of a part of the line head.

As shown in FIG. 18, in the image writer 23 (line head), an organic EL element array 51 is held in an elongated housing 60. Positioning pins 69 provided on both ends of the housing 60 are fitted in the opposed positioning holes of a case, and furthermore, fixing screws are inserted into the screw holes of the case through screw insertion holes 68 provided on both ends of the housing 60 to carry out a fixation. Consequently, the image writer 23 is fixed into a predetermined position.

Light emitters 63 forming the organic EL element array 51 are provided on a glass substrate 62, and each of which is driven by a TFT driving circuit 72 formed on the same glass substrate 62. The TFT driving circuit 72 serves to drive the light emitter by using an active matrix method. A lens array 65 including a plurality of refractive index distribution type rod lenses 65' are disposed in front of the light emitters 63 to constitute an image forming optical system. The housing 60 covers the periphery of the glass substrate 62 and opens a side facing the image carrier 20. Thus, a light beam is emitted from the rod lens 65' toward the image carrier 20. A light absorbing member (a coating material) is provided on the face of the housing 60 which is opposed to the end face of the glass substrate 62.

The line head according to the invention has a light emitter formed on a board and a TFT driving circuit for driving the light emitter by using the active matrix method as shown in FIG. 18. The light emitter has such a basic structure as to carry out a gradation control through a pulse width control (PWM control). In a case where the line head having such a structure is provided with a tilt with respect to a reference position in the direction of a primary scanning line as described above, a correction thereof is carried out through the pulse width control.

Figure 20:
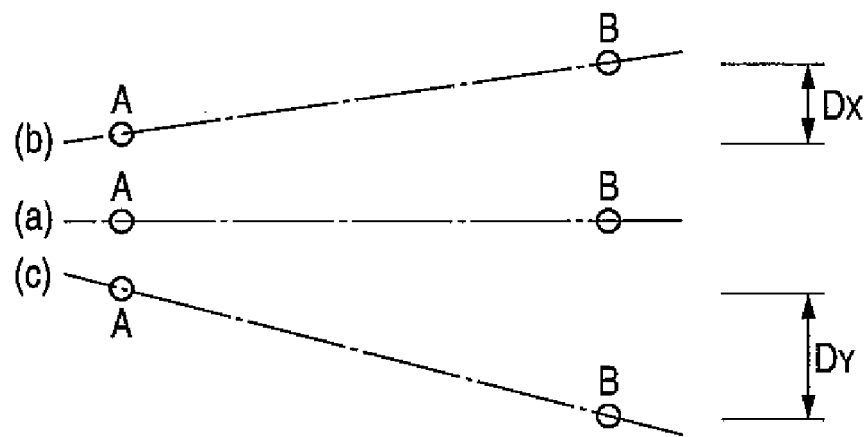
FIG. 20 is a diagram for explaining how to detect a tilt of the line head.
Figure 21:
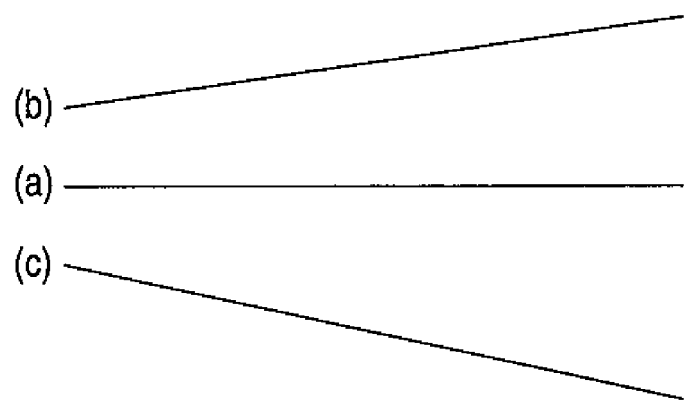
FIG. 21 is a diagram for explaining the attitude of the line head.

FIG. 20 is an explanatory diagram showing the principle of the detection of the tilt of the line head according to the invention. Referring to FIG. 20 corresponding to FIG. 21, (a) shows an example in which the line head is normally attached, (b) shows an example in which the line head is attached with a tilt of Dx in a rightward and upward direction in the drawing, and (c) shows an example in which the line head is attached with a tilt of Dy in a rightward and downward direction in the drawing.

It is possible to decide the tilt of the line head by detecting whether the test pattern is parallel with a reference line or is inclined thereto. In other words, it is possible to detect the tilt of the line head by detecting the direction of a straight line connecting two points of A and B. Based on such a knowledge, in this embodiment, the line head is provided with a plurality of light emitters to generate a test pattern on the same line in the primary scanning direction and the test pattern is formed in positions of the image carrier which correspond to A and B in FIG. 20. The test pattern is detected by detector such as an optical sensor and the direction of the straight line connecting the two points of A and B is obtained by the controller. By calculating a difference between the reference line and the direction of the straight line connecting the two points of A and B, subsequently, It is possible to detect the tilt of the line head.

Figure 1:
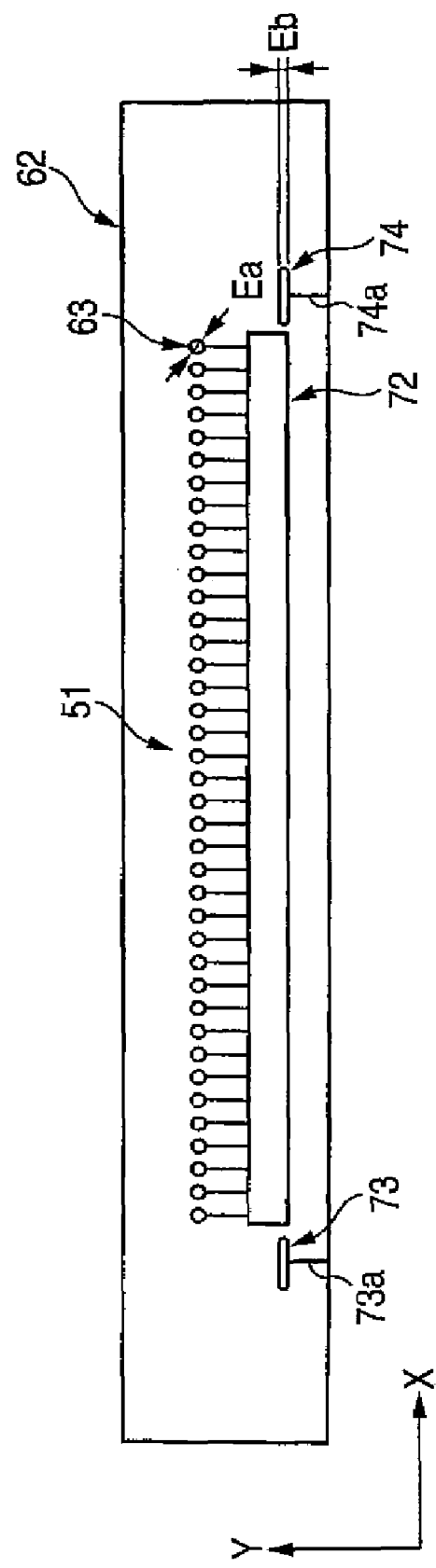
FIG. 1 is a schematic plan view of a line head according to one embodiment of the invention.

As shown in FIG. 1, a plurality of light emitters (organic EL elements) 63 are arranged on the same line corresponding to the primary scanning direction so that a light emitter array 51 is formed. A direction X of the glass substrate 62 corresponds to a primary scanning direction and a direction Y corresponds to a secondary scanning direction.

A plurality of light emitters 73 and 74 to form a pattern for detecting the tilt of the line head is provided on both ends in the primary scanning direction of the glass substrate 62. The light emitters 73 and 74 are provided on the same line in the primary scanning direction with a greater length in the primary scanning direction than in the light emitter 63. Moreover, lengths (widths) in the secondary scanning direction of the light emitters 73 and 74 are set to be smaller than the diameter of the light emitter 63. For example, a diameter Ea of the light emitter 63 is 50 µm and a width Eb of the light emitter 74 is 25 µm. Therefore, it is possible to easily carry out tilt detection when the test pattern is formed. Since the lengths (widths) in the secondary scanning direction of the light emitters 73 and 74 are set to be smaller than the diameter of the light emitter 63, a cost can be reduced.

The light emitters 73 and 74 are provided on the glass substrate 62 in different positions in the secondary scanning direction from the light emitter array 51. Therefore, it is possible to effectively utilize the space of the substrate 62. Moreover, the light emitters 73 and 74 are provided on the outside of image forming regions at both ends of the glass substrate 62. Even if the test pattern is formed, therefore, the printing of an image can be prevented from being disturbed.

The light emitters 73 and 74 are connected to a separate driving circuit from the driving circuit 72 through lead wires 73a and 74a. Therefore, it is possible to drive the light emitters 73 and 74 in an arbitrary timing, thereby forming a test pattern. A timing to form the test pattern can be properly set to the time that the image forming apparatus is activated, the time of a rise in a temperature, the time after printing a constant number of sheets, the time that the printing is being carried out and the time after exchanging a cartridge. The light emitters 73 and 74 may be connected to be driven by the driving circuit 72 which is common to each of the light emitters 63 in the light emitter array 51. Moreover, the light emitters 73 and 74 may be provided in the image forming region. In this case, the test pattern is prevented from being transferred on a recording sheet by not supplying the recording sheet.

In the embodiment, thus, a plurality of light emitters to form a pattern for detecting the tilt of the line head is provided on the substrate on which the light emitter for image formation is provided. For this reason, it is not necessary to externally input a test pattern. Moreover, it is not necessary to hold the test pattern as stored data in a controller. Consequently, it is possible to simplify the structure of the controller.

Figure 2:
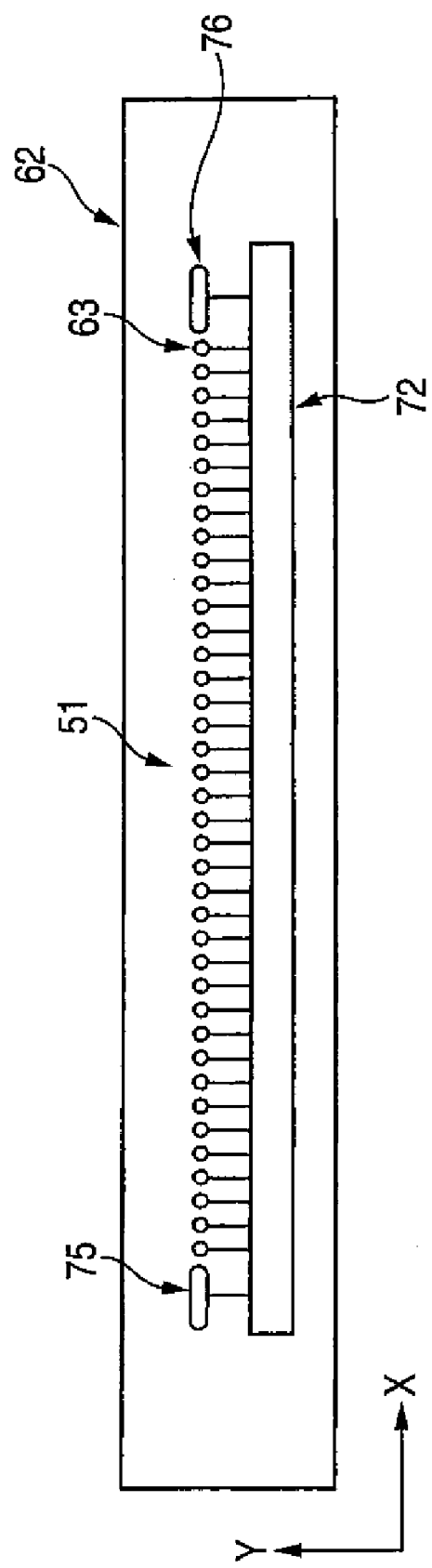
FIG. 2 is a schematic plan view of a modified example of the line head of FIG. 1.

FIG. 2 shows a modified example of the above configuration. Components similar to those in the above configuration will be designated by the same reference numerals and repetitive explanations for those will be omitted. In this example, a plurality of light emitters 75 and 76 to form a pattern for detecting the tilt of a line head is provided so as to align with the light emitter array 51. Therefore, the light emitters 75 and 76 can be formed in the same process as the light emitter array 51. Consequently, a manufacturing process can be simplified.

While the light emitters 75 and 76 are provided in an image forming region, moreover, a test pattern is prevented from being transferred onto a recording sheet by not supplying the recording sheet. Thus, the light emitters 75 and 76 can be provided in the image forming region. Therefore, it is possible to increase the degree of freedom of the arrangement of the light emitter to form the test pattern. In this example, the driving circuit 72 serves to drive the light emitter array 51 and the light emitters 75 and 76 to form the test pattern in common. As will be described below, the driving circuit 72 is provided with a switcher. Consequently, it is possible to control the formation of the test pattern and the formation of an image by switching the light emitter to be driven. Therefore, it is not necessary to separately provide a driving circuit. Thus, a cost can be reduced. It is also possible to employ a structure in which the light emitters 75 and 76 are driven by different driving circuits as in the case of FIG. 1.

Figure 3:
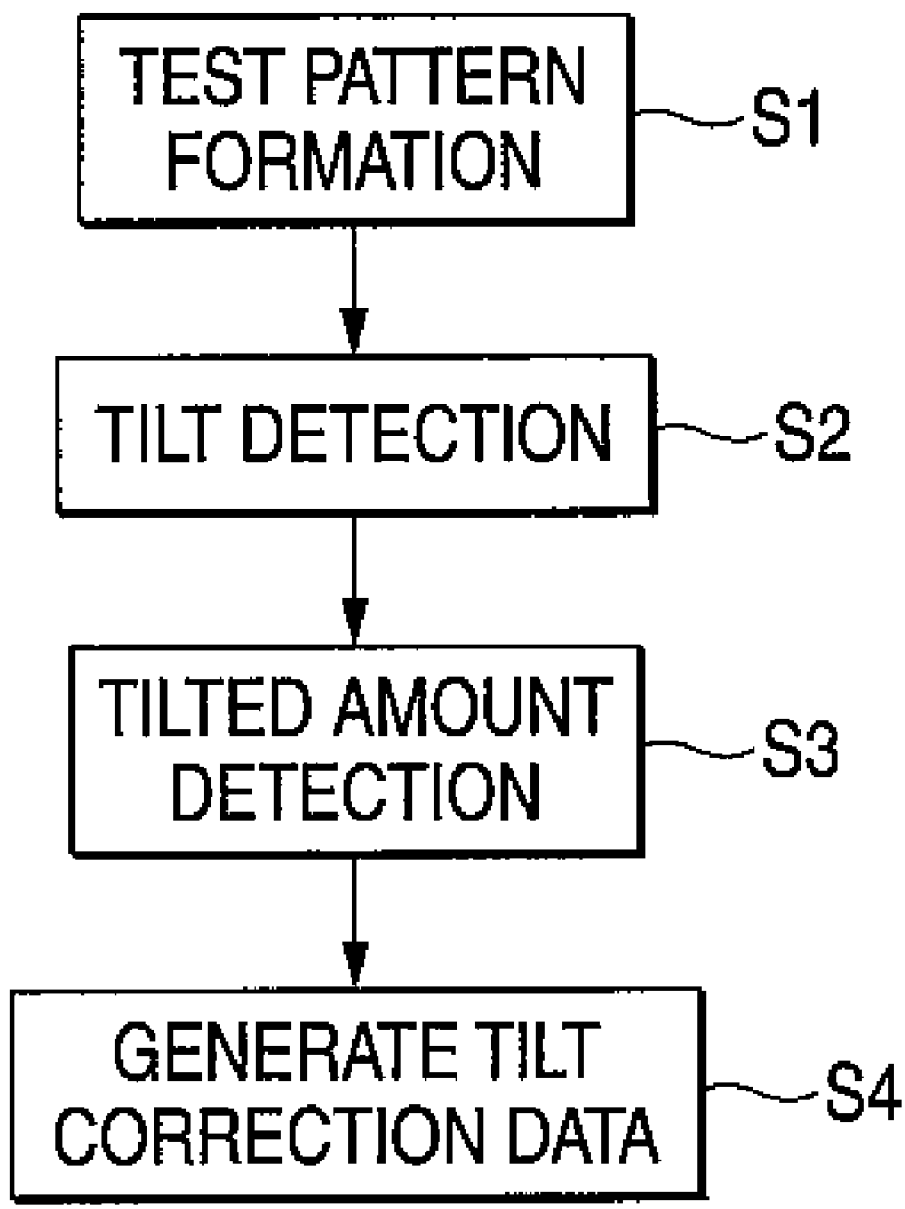
FIG. 3 is a flow chart showing a process for generating data for correcting a tilt of the line head.

As shown in FIG. 3, a driving signal is generated in the predetermined timing to cause the light emitters 73 and 74 (FIG. 1) or 75 and 76 (FIG. 2) to emit a light beam, thereby forming a test pattern every line head associated with one color (Step S1). Next, the test pattern for each color thus formed is detected by using a sensor. In this case, timings that the test pattern is detected by the sensor are compared with each other on the left and right (both ends) of the line head and a difference between the timings is stored as tilt data (Step S2).

The tilt data of the line head are compared with a reference line (an absolute reference or a line head for a certain color) and the amount of the tilt of the line head is calculated (Step S3). In a case where the line head having a certain color is set to be a reference, the amount of the tilt of the line head is set to zero. Furthermore, the amount of the tilt is calculated to be a multiple of the width of one primary scanning line and the value is input as tilt correction data to the controller of the line head (Step S4).

Figure 4:
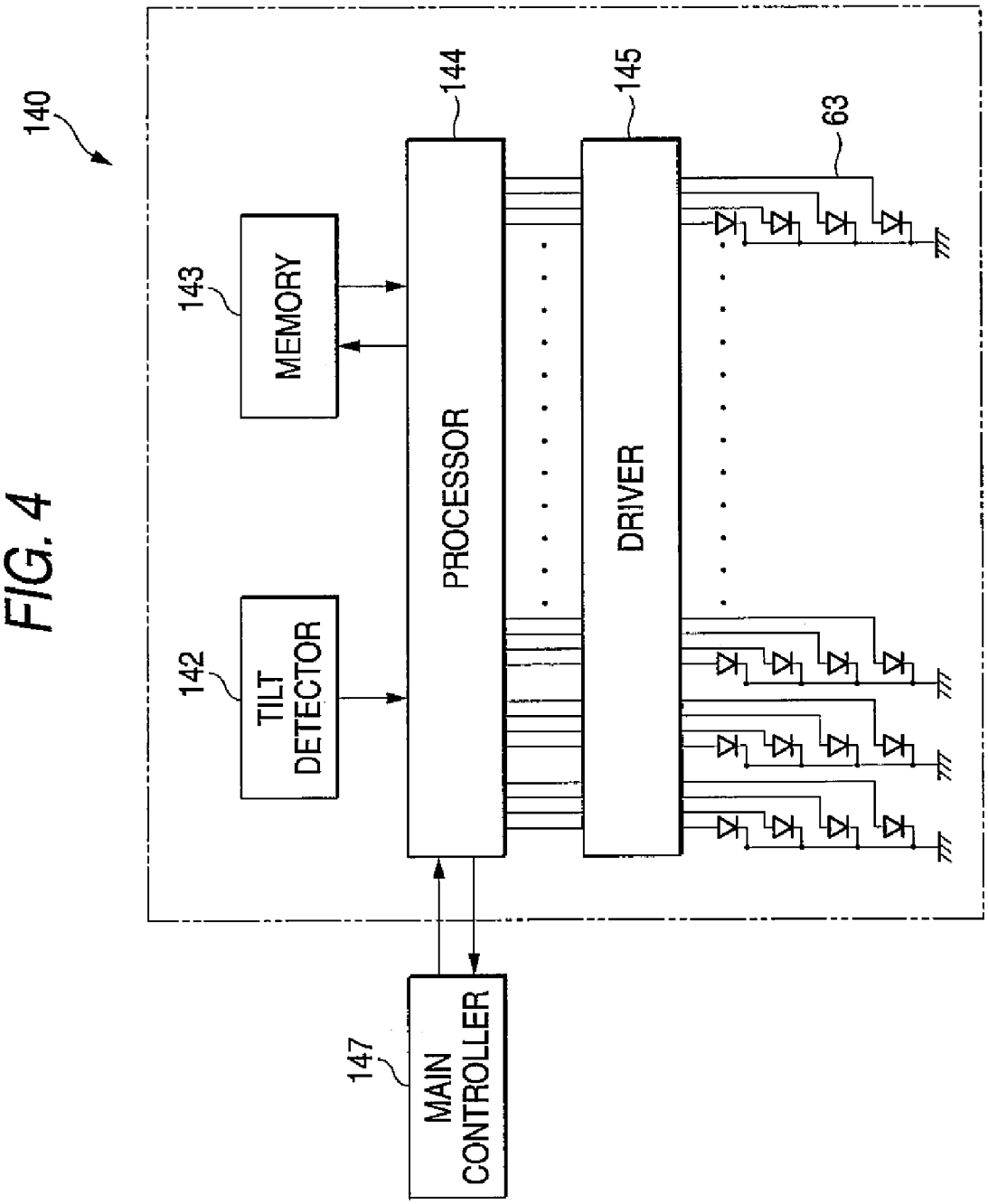
FIG. 4 is a block diagram of a controller of the line head.

As shown in FIG. 4, a main controller 147 is constituted by a computer, for example, and forms image data. Moreover, a controller 140 disposed in the image forming apparatus is provided with a tilt detector 142, a memory 143, a processor 144 constituted by a CPU, and a driver 145 which serve to control a light emitter array 51 formed by the light emitter 63. The tilt detector 142 serves to detect the tilt of the line head by the detection of the test pattern as described above, and information about the tilt is stored in the memory 143. The processor 144 serves to generate a gradation signal with a tilt correction signal based on the information about the tilt which is stored in the memory 143. The driver 145 serves to drive each of the light emitters arranged in the line head so as to correct the tilt.

While the processings and controls of the tilt detector 142, the memory 143 and the driver 145 are carried out by the processor 144 in FIG. 4, it is also possible to directly execute the processings and controls of the tilt detector 142, the memory 143 and the driver 145 by the main controller 147. In this case, the structure of the control system of the image forming apparatus can be simplified.

In this embodiment, an organic EL element is used for the light emitter. However, it is also possible to use an LED (Light Emitting Diode) in addition to the organic EL element, for example. Since static control can be executed with respect to the organic EL element, it is possible to simplify a control system for correcting the tilt of the line head. In a case where the light emitter is constituted by the LED, the light emitter can easily be manufactured in a structure in which the tilt of the line head is corrected.

In some cases, the light emitter is formed by the organic EL element, and the control transistor of the light emitter and the drive transistor are formed by a TFT (Thin Film Transistor) on the same board. In these cases, the transistors and the light emitters can be fabricated in the same manufacturing process. Consequently, it is possible to reduce a manufacturing cost. In addition, a space can also be saved. In FIGS. 1 and 2, since the transparent glass substrate 62 is used, it is possible to irradiate a light on the image carrier without reducing the amount of the light of the light emitter constituted by the organic EL element.

Thus, in a case where the image forming apparatus shown in FIG. 17 incorporates the line head 10 of the invention as the image writer 23, it is possible to reduce the size of the apparatus than that in a case where a laser scanning optical system is used.

In a case where an organic EL element is used for the light emitter of the line head, a variation in the amount of the light of the light emitter itself is also smaller than that in the amount of a light transmitted through the lens array. When the center line of the lens array and the light emitter array can be positioned with high precision, the amount of the light can be caused to be uniform and a spot diameter can also be equal even if the amount of the light is not corrected. Therefore, it is possible to constitute a line head having high image quality.

Figure 5:
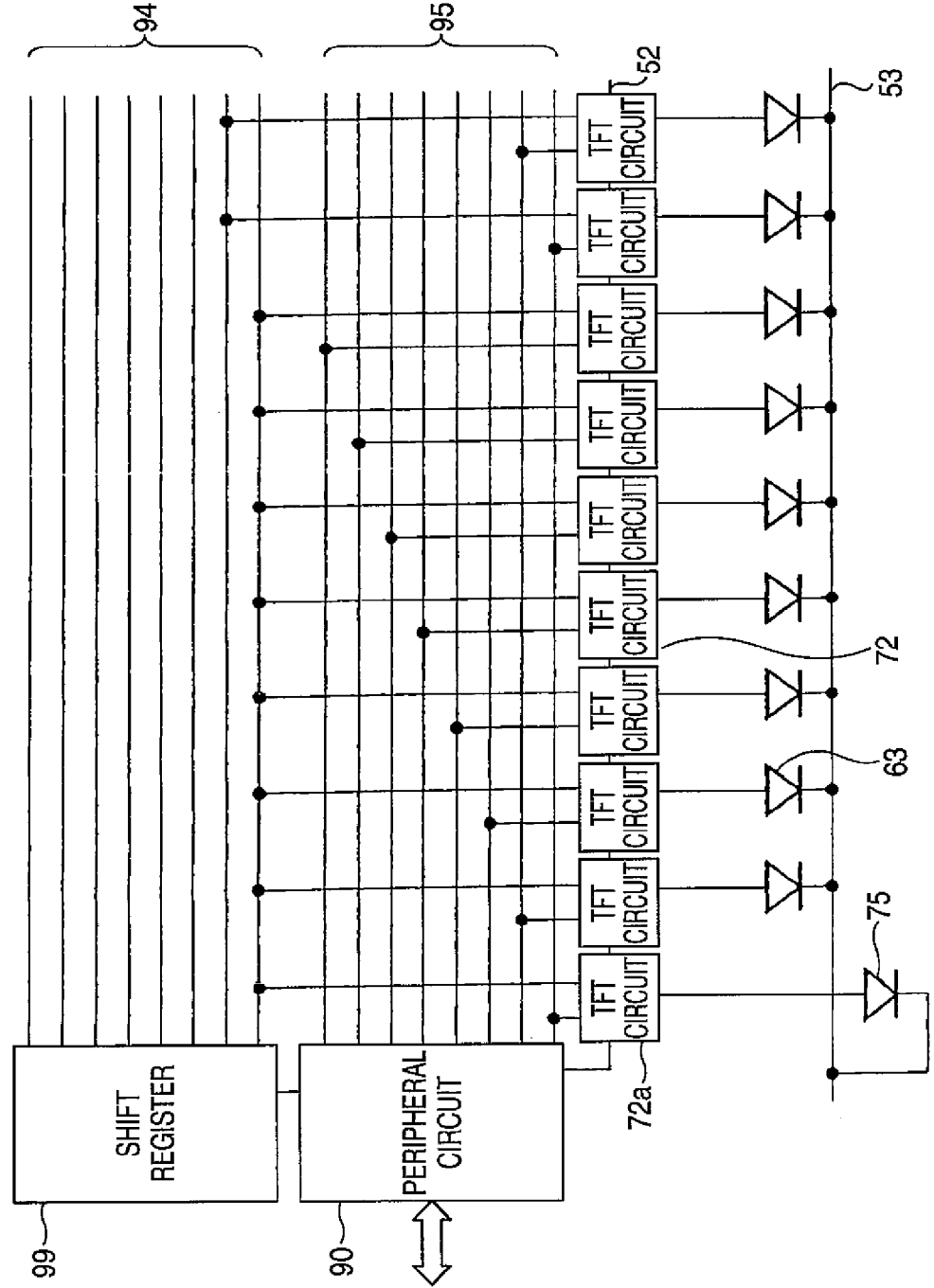
FIG. 5 is a circuit diagram of a first example of a driver shown in FIG. 4.

FIG. 5 is a circuit diagram showing the structure of the controller which corresponds to the example of FIG. 2. A peripheral circuit 90 is connected to the main controller 147 thereby communicating control data. A ground line 53 is connected to a cathode of the light emitter 63 for forming an image and the line light source 75 for forming a test pattern in common. The light emitter 63 is controlled by the TFT circuit 72 connected individually and the light emitter 75 to form the test pattern is controlled by a TFT circuit 72a on a left end in the drawing.

In this case, control data formed by the main controller 147 are input to the peripheral circuit 90 and are output from the peripheral circuit 90 to a shift register 09. The shift register 99 selects one of scan lines 94 based on the control data. The scan lines 94 are connected to the TFT circuits 72, and the scan line 94 selected by the shift register 99 applies a control signal to each of the associated TFT circuits 72 or the associated TFT circuit 72a for driving the associated light emitters 63 or the associated light emitter 75.

Moreover, the peripheral circuit 90 is connected to the TFT circuits 72 via data lines 95 and a power supply line 52 on anode side, and at least one of the TFT circuit 72 to which the control signal is applied from the scan line 94 is activated so that the corresponding light emitter 63 is turned ON in accordance with the data supplied from the data line 95. In this case, when the TFT circuit 72a is activated, the light emitter 75 to form the test pattern is turned ON.

Figure 6:
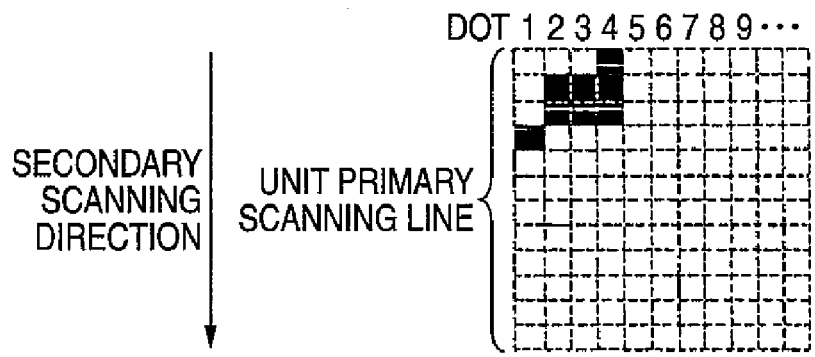
FIG. 6 is a diagram for explaining how to perform the tilt correction of the line head.
Figure 7:
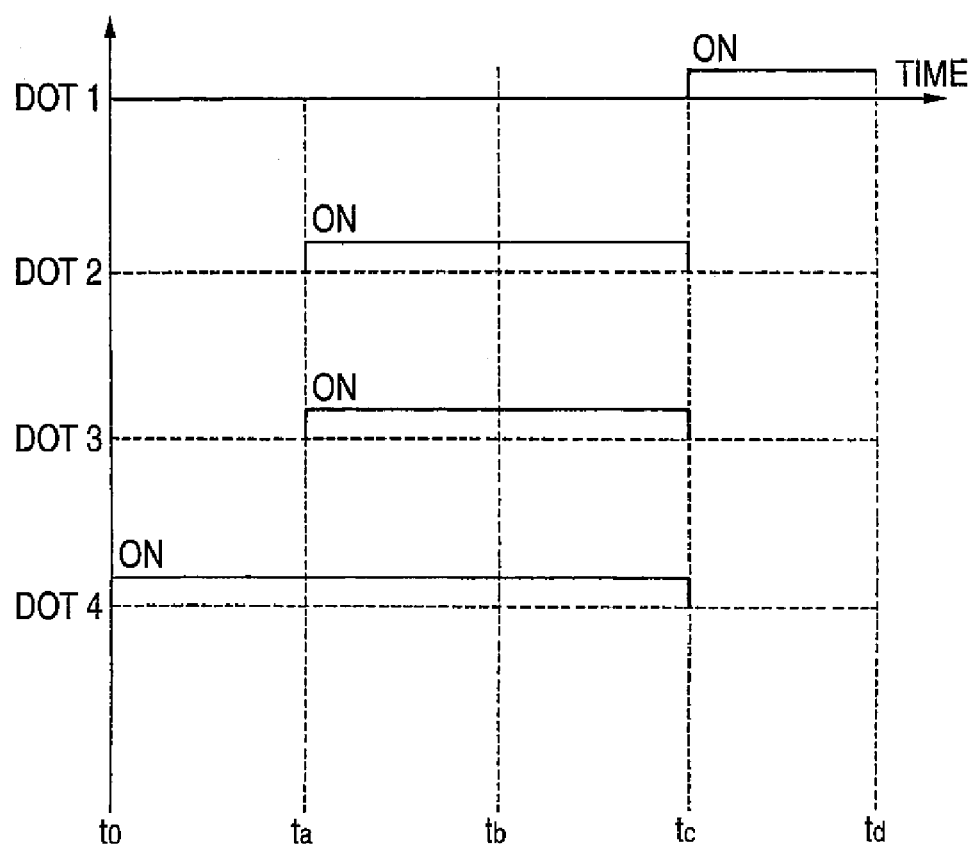
FIG. 7 is a time chart for explaining how to perform the tilt correction of the line head.

FIGS. 6 and 7 show how to correct the detected tilt of the line head. In FIG. 6, the horizontal direction corresponds to the primary scanning direction in which the light emitters 63 are arrayed. That is, "dots 1, 2, 3, . . . " represent the respective light emitters 63. In this embodiment, a width in the secondary scanning direction (corresponding to the vertical direction of this figure) of each primary scanning line is divided into "n" segments. The number of "n" represents the maximum number of gradation levels that the image forming apparatus can reproduce. The black segment in this figure represents a light emitting state of the light emitter 63 (i.e., gradation data). That is, as to the dot 1, the corresponding light emitter 63 emits light so as to form a dot corresponding to a gradation level 1, and as to the dot 4, the corresponding light emitter 63 emits light so as to form a dot corresponding to a gradation level 3. The maximum number of gradation levels in this example is 12.

In this embodiment, the start timing of the light emission is individually controlled with respect to the light emitters 63 so that the tilt of the line head is properly corrected. In FIG. 6, the white segment above the black segment represents the amount of correction in accordance with the detected tilt (i.e., tilt correction data). In other words, the emission timing of the respective light emitters are controlled with the gradation data and the tilt correction data.

FIG. 7 shows a timing chart for realizing the emission pattern shown in FIG. 6. Specifically, t0 is a time point that a recording medium is started to be fed in the direction of an arrow in FIG. 6 (the secondary scanning direction). An image for the dot 1 is formed between times tc to td. In this case, the gradation data indicates a time period that the light emitter 63 is activated (the pulse width), and the tilt correction data indicates a delay of the emission timing from the time point t0.

The formation of images for the dots 2 and 3 in FIG. 7 is carried out for times ta to tc and a pulse width is a double of a pulse width of the dot 1. Moreover, the formation of an image for the dot 4 is carried out for the times t0 to tc and a pulse width is three times as great as the pulse width of the dot 1. Thus, the formation of the images for the dots 2 to 4 is carried out in a different timing from that for the dot 1. As described above, the pulse width to be applied to the light emitter in the dots 2 to 4 is different from the pulse width of the dot 1. That is, by adjusting the pulse width (PWM control) and the delay of the start timing of the pulse, the light emitter can be controlled so as to reproduce a desired gradation level in accordance with the detected tilt of the line head.

Figure 8A:
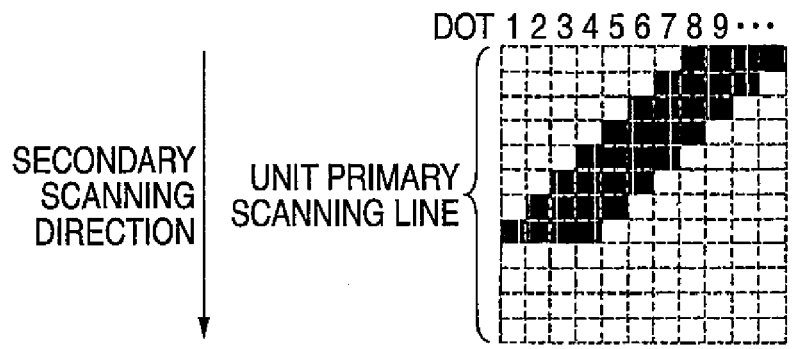
FIGS. 8A to 9 are diagrams for explaining another examples of the tilt correction of the line head.

FIG. 8A shows another example of the light emission pattern corresponding to a different detected result as the tilt of the line head. By controlling the emission timing with respect to the individual light emitters, a fine gradation control can be carried out.

Figure 8B:
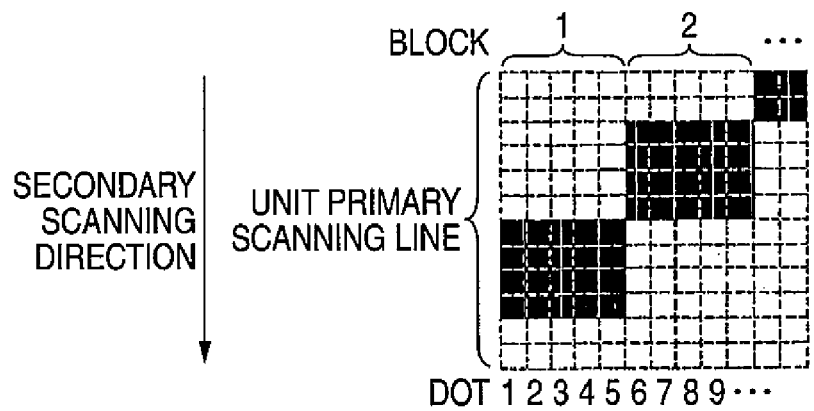

FIG. 8B shows a modified example of the tilt correction. In this example, the light emitter array 51 is divided into a plurality of blocks each including a plurality of light emitters 63. The gradation data and the tilt correction data are handled with respect to each of the divided blocks. This example is suitable for reproduction of a natural picture.

In some cases in which the gradation control is carried out over the light emitter with a correction value corresponding to a tilt as described with reference to FIGS. 6 to 8, a step is generated on an image so that the quality of an image is deteriorated. Therefore, the correction value corresponding to the tilt is further subjected to a smoothing processing, thereby preventing the deterioration in the quality of an image.

Figure 9:
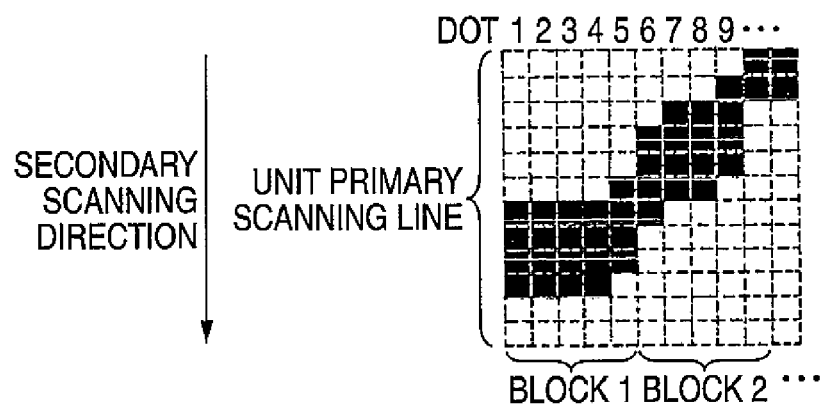

In FIG. 8B, a step is generated on a boundary between the gradation value of the block 1 and that of the block 2 (between the dots 5 and 6). For this reason, the light emission timings of the dots 5 and 6 on the boundary between the blocks 1 and 2 are shifted from each other to carry out the smoothing processing as shown in FIG. 9. Accordingly, it is possible to eliminate the step generated when correcting the tilt of the line head by using the gradation data, thereby forming a fine image.

Figure 10:
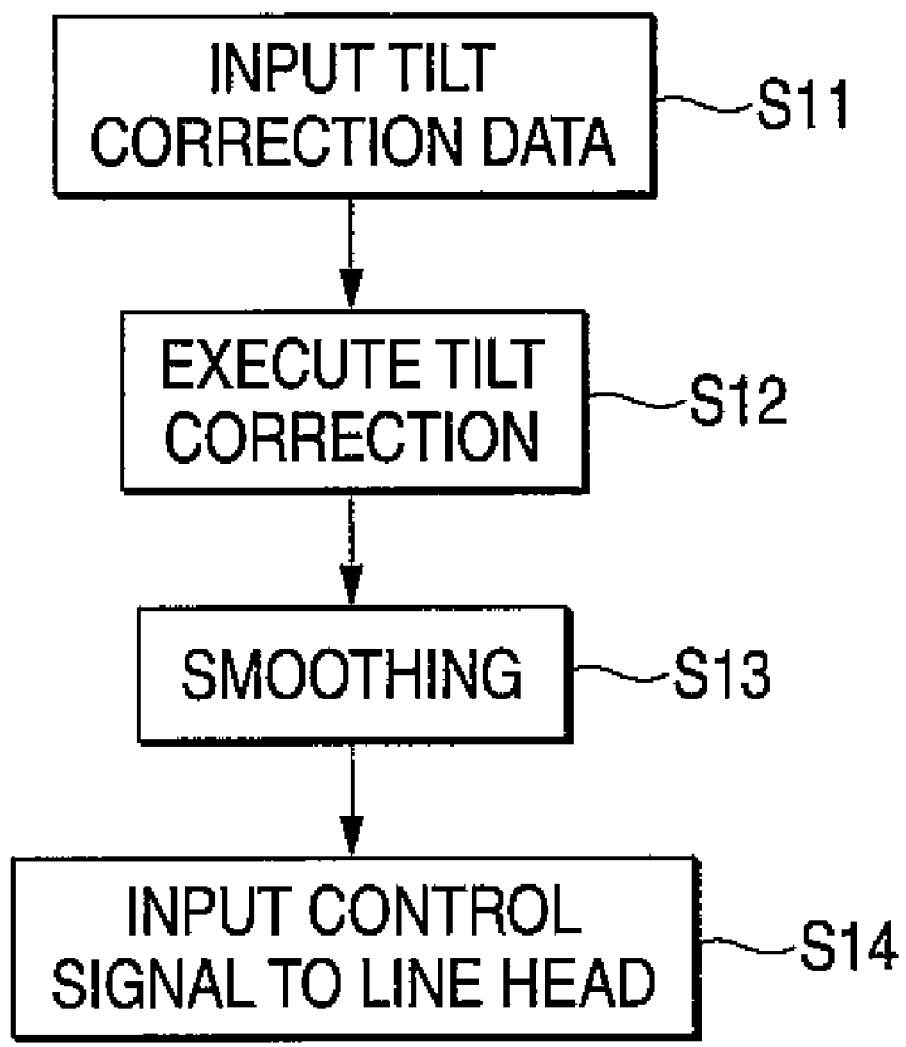
FIG. 10 is a flow chart showing the tilt correction of FIG. 9.

FIG. 10 is a flowchart showing a processing procedure in the execution of the smoothing processing in FIG. 9. The tilt correction data of the line head are input to the controller 140 (Step S11). Next, tilt correction data are generated (Step S12). Subsequently, data are generated by carrying out the smoothing processing over the tilt correction data (Step S13). The light emitter of the line head is controlled based on the data obtained by carrying out the smoothing processing over the tilt correction data (step S14).

Figure 11:
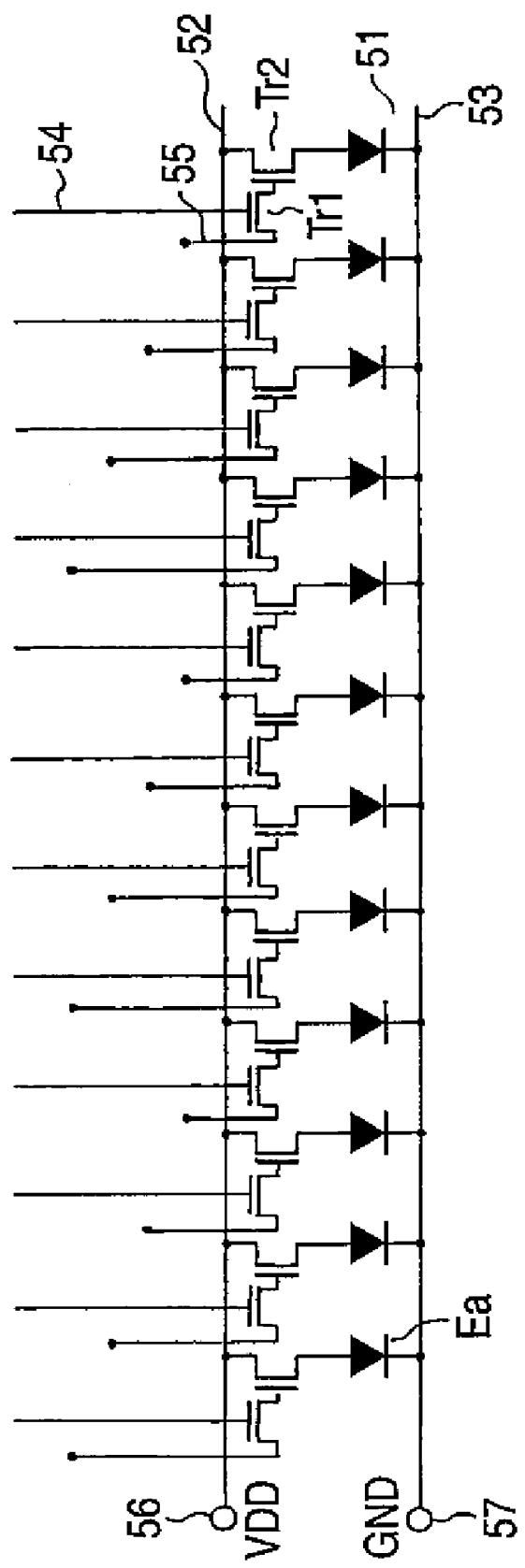
FIG. 11 is a circuit diagram of a second example of a driver shown in FIG. 4.

FIG. 11 is a circuit diagram showing an example in which the individual control described with reference to FIG. 8A. A large number of organic EL elements Ea are arranged in the line head 10 in a primary scanning direction so that a light emitter array 51 is formed. A power feeding point 56 is provided on a power supply (VDD) side line 52 and a power feeding point 57 is provided on a ground (GND) line 53. A drive transistor Tr2 is formed on the same board as the organic EL element Ea. A drain of the drive transistor Tr2 is connected to the power supply line 52. A gate and a source S of the drive transistor Tr2 are connected to the anode electrode of the organic EL element Ea. The gate of the drive transistor Tr2 is connected to a source of a control transistor Tr1. The control transistor Tr1 and the drive transistor Tr2 are formed by an FET (Field Effect Transistor), for example.

A signal line 54 and a signal line 55 are respectively connected to a gate and a drain of the control transistor Tr1. Each of the organic EL elements Ea arranged in the light emitter array 51 is connected between the power supply line 52 connected to the power feeding point 56 and the ground line 53 connected to the power feeding point 57.

Since the control transistor Tr1 and the drive transistor Tr2 are connected to each of the light emitters Ea forming the light emitter array 51, the light emitter Ea can be individually subjected to a PWM control in response to the gradation signal for the tilt correction which is formed by the processor 144 of the controller 140 or the control signal obtained by carrying out the smoothing processing over the gradation signal described with reference to FIG. 9.

Figure 12:
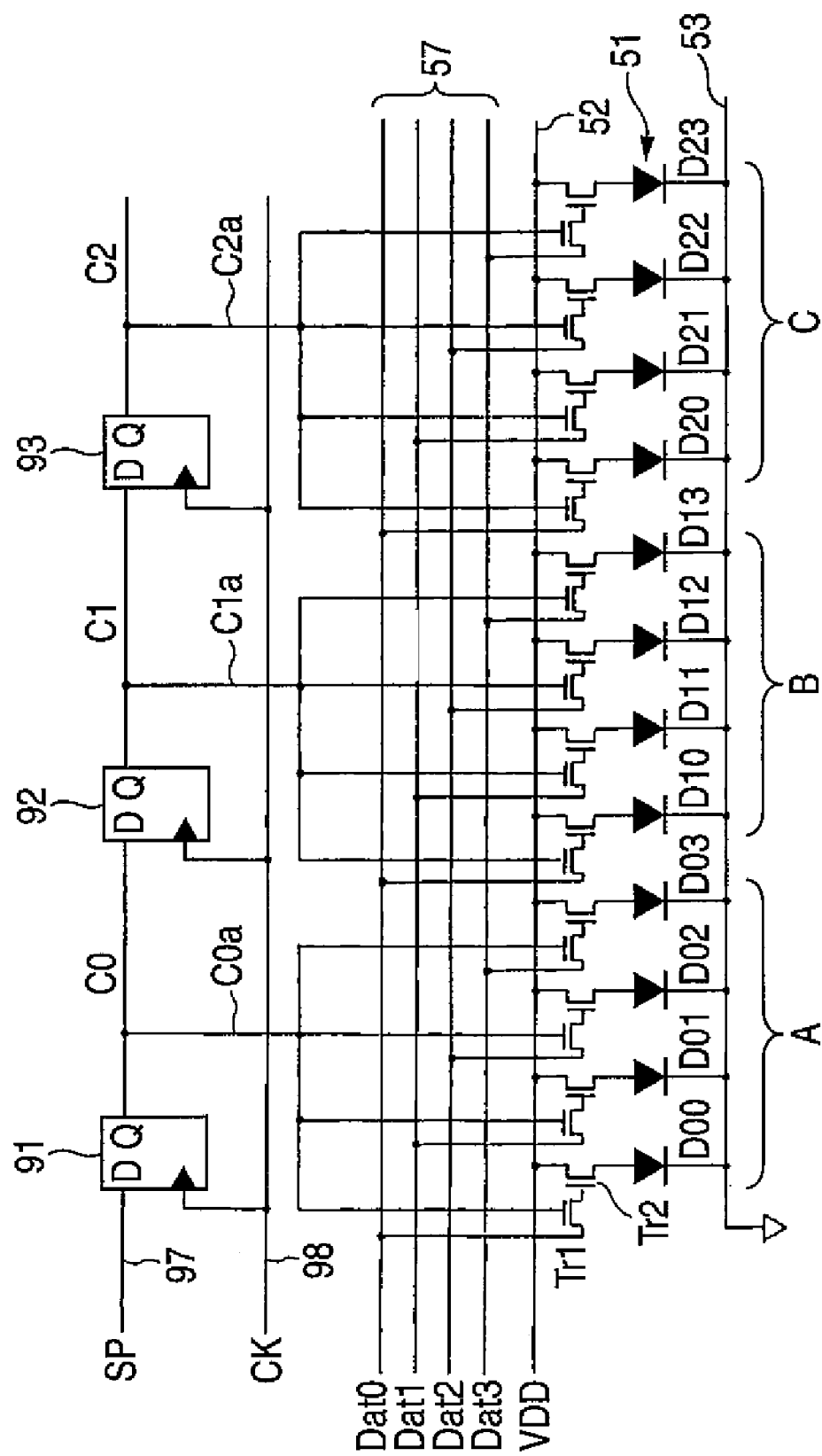
FIG. 12 is a circuit diagram of a third example of a driver shown in FIG. 4.
Figures 13, 14:
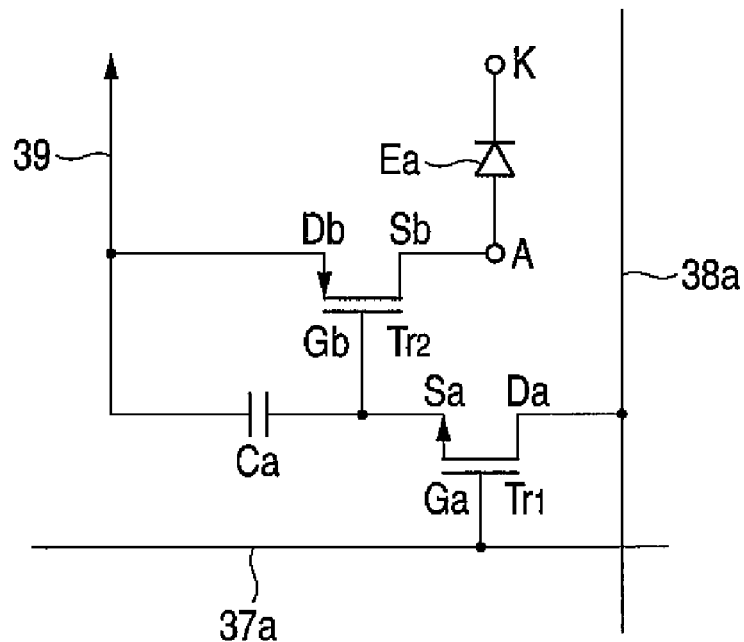
FIG. 13 is a circuit diagram of a fourth example of a driver shown in FIG. 4.
FIG. 14 is a table showing data examples corresponding to gradation levels to be reproduced.

FIG. 13 is a circuit diagram showing an example of a block control described with reference to FIG. 8B. Components similar to those in FIG. 12 will be designated by the same reference numerals and repetitive explanations for those will be omitted. Light emitters D00 to D23 using an organic EL element or an LED are arranged in the light emitter array 51, for example.

Shift registers 91-93 collectively controls the light emitters D00 to D23 as a block unit, that is, an output signal C0 of the shift register 91 controls a block A including the light emitters D00 to D03. Similarly, an output signal C1 of the shift register 92 controls a block B including the light emitters D10 to D13, and an output signal C2 of the shift register 93 controls a block C including the light emitters D20 to D23.

SP denotes a start pulse to be input from a signal line 97 to a data terminal D of the shift register 91 and CK denotes a clock signal to be input from a signal line 98 to each of the shift registers 91 to 93.

An output signal C0 to be output from an output terminal Q of the shift register 91 is applied through a signal line C0a to the gate of each of the control transistors Tr1 connected to the light emitters D00 to D03. C1 denotes an output signal of the shift register 92 which is applied through a signal line C1a to the gate of each of the control transistors Tr1 connected to the light emitters D10 to D13. C2 denotes an output signal of the shift register 93 which is applied through a signal line C2a to the gate of each of the control transistors Tr1 connected to the light emitters D20 to D23.

Thus, the shift register 91 selects the light emitters D00 to D03 of the block A from the light emitters of the light emitter array 51. Moreover, the shift register 92 selects the light emitters D10 to D13 of the block B and the shift register 93 selects the light emitters D20 to D23 of the block C. More specifically, the shift registers 91 to 93 serve as a block selector. When the respective signals C0 to C2 output from the shift registers have an H level, a signal is applied to the gate of each of the control transistors Tr1 for controlling the light emitter of the block. Therefore, it is possible to select the block with a simple structure for pulse driving.

Next, description will be given to the data signals Dat0 to Dat3 of a data line 57. The data signals are supplied to the drains of the control transistors Tr1. When the data signals Dat0 to Dat3 are supplied to the control transistors Tr1 of the light emitters selected in response to the block selection signal, accordingly, the drive transistors Tr2 connected to the control transistors Tr1 are conducted so that the corresponding light emitters are operated. With a structure in which the block selection signal is supplied to the drain of the control transistor Tr1 and the data line is connected to the gate of the control transistor Tr1, similarly, the same operation can be carried out.

Referring to the block A, for example, the data signals Dat0 to Dat3 are supplied to the control transistors Tr1 for controlling the light emitters D00 to D03, respectively. More specifically, the data signals Dat0 to Dat3 serve as signals for selecting the individual light emitters in the same block. In the line head according to the invention, thus, it is also possible to select the individual light emitters to carry out an ON operation. Referring to the data signals Dat0 to Dat3, gradation data are converted into time-domain data to be supplied to each of the light emitters as described above.

With the structure shown in FIG. 13, the light emitters arranged in the light emitter array 51 can be divided by a proper number to correspond to the correction of the tilt of the line head in the formation of a plurality of blocks. In this case, each of the light emitters Ea can be PWM controlled on a unit of the block in response to a gradation signal for the correction of a tilt formed by the processor 144 of the controller 140 or a control signal obtained by carrying out a smoothing processing over the gradation signal described with reference to FIG. 9.

FIG. 14 is a circuit diagram for operating the light emitter in an active matrix. An organic EL element is used as the light emitter Ea, and K denotes a cathode terminal and A denotes an anode terminal. The cathode terminal K is connected to a ground line which is not shown. A scanning line 37a Is connected to a gate Ga of a switching TFT (Tr1). A signal line 38a is connected to a drain Da of the switching TFT. A driving TFT (Tr2) for the organic EL element has a drain Db connected to a power supply line 39 and a source Sb connected to the anode terminal A of the organic EL element. Furthermore, a gate Gb of the driving TFT is connected to a source Sa of the switching TFT.

When the scanning line 37a and the signal line 38a are conducted in a state in which the voltage of the power line 39 is applied to the source of the switching TFT, the switching TFT is turned ON. For this reason, the gate voltage of the driving TFT is dropped and the voltage of the power line 39 is supplied from the drain of the driving TFT so that the driving TFT is conducted. As a result, the organic EL element is operated to emit a light in a predetermined amount. A storage capacitor Ca is charged with the voltage of the power line 39.

Also in a case where the switching TFT is turned OFF, the driving TFT is set in a conduction state based on electric charges stored in the storage capacitor Ca and the organic EL element maintains a light emission state. In the case in which an active matrix is applied to the driving circuit of the light emitter, accordingly, the operation of the organic EL element can be continuously carried out to maintain the emission of a light and a pixel can be exposed at a high luminance also when the switching TFT is turned OFF.

By providing the TFT circuit for driving the organic EL element using the active matrix method, thus, it is possible to easily change the light emission timing of each of the light emitters with a unit amount corresponding to a minimum pulse width of the tilt correction data. Therefore, it is possible to properly set a pulse width by taking the correction of a tilt into account, thereby correcting the tilt of the line head easily.

As shown in FIG. 14, the gradation data are stored in an 8 bit gradation data memory. In this example, bit data No. 1 is associated with a state that no light is emitted (lowest gradation level), bit data No. 8 is associated with the highest density (gradation level), and bit data Nos. 2 to 7 are associated with halftone density (gradation level).

Figure 15:
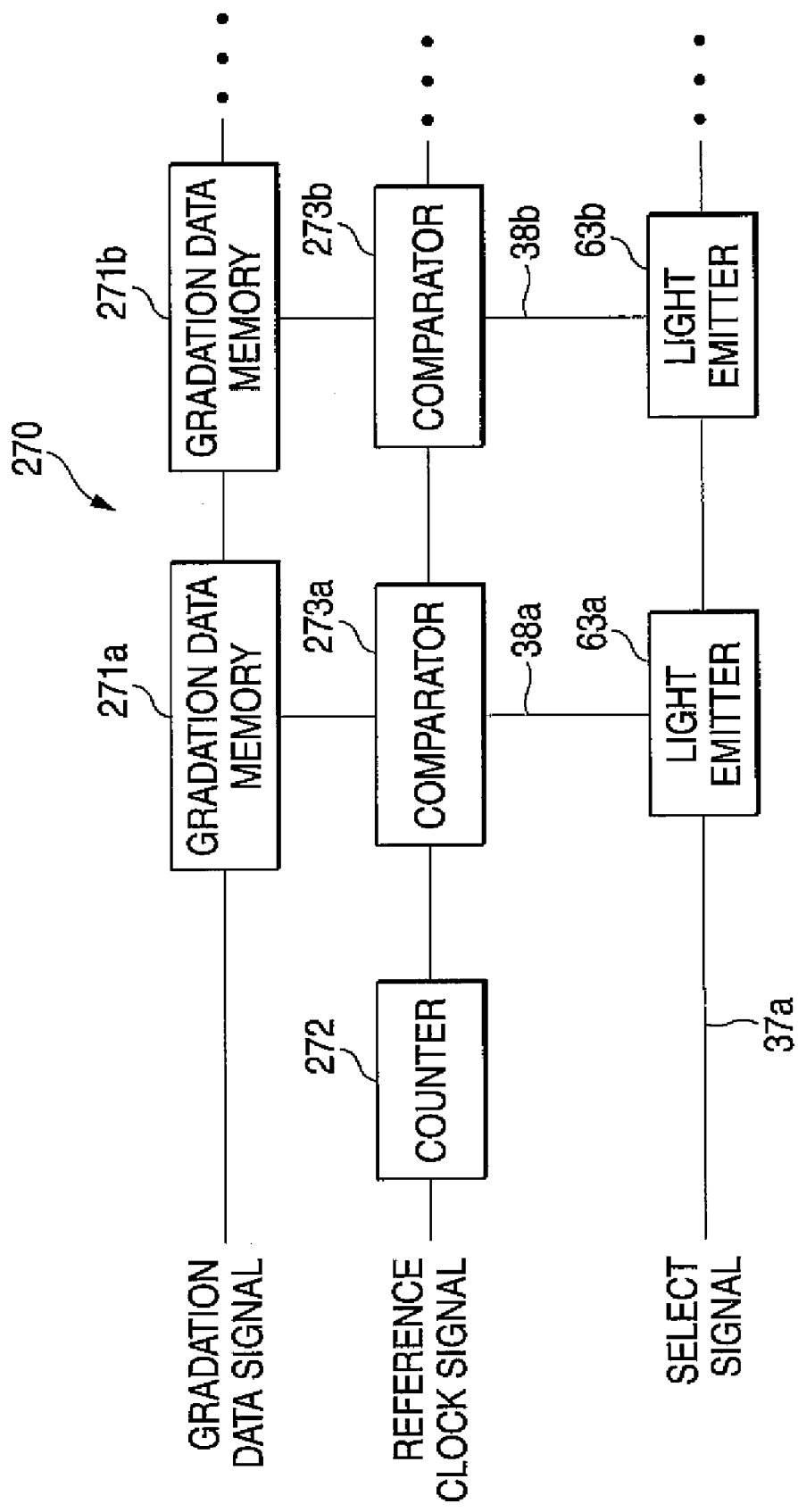
FIG. 15 is a block diagram of a PWM controller including the circuit shown in FIG. 13.

As shown in FIG. 15, a PWM controller 270 is provided with gradation data memories 271a, 271b ... constituted by a shift register, a counter 272, comparators 273a, 273b ... , and light emitting portions 63a, 63b .... A gradation data signal is supplied from the processor 144 shown in FIG. 6 to the gradation data memories 271a, 271b..., for example. The number of bits of each of the gradation data memories 271a, 271b... is set to be eight as shown in FIG. 14. The counter 272 counts a reference clock signal.

The number of the bits of the counter 272 is set to be eight in the same manner as in the gradation data memories 271a, 271b ... and a count value repeats 0→a maximum value (255)→0→the maximum value. The comparators 273a and 273b compare the signal of the counter 272 with gradation data stored in the gradation data memories 271a, 271b .... When the gradation data are greater than a counter value, the switching TFT is turned ON. When the gradation data are equal to or smaller than the counter value, moreover, the switching TFT is turned OFF.

Figure 16:
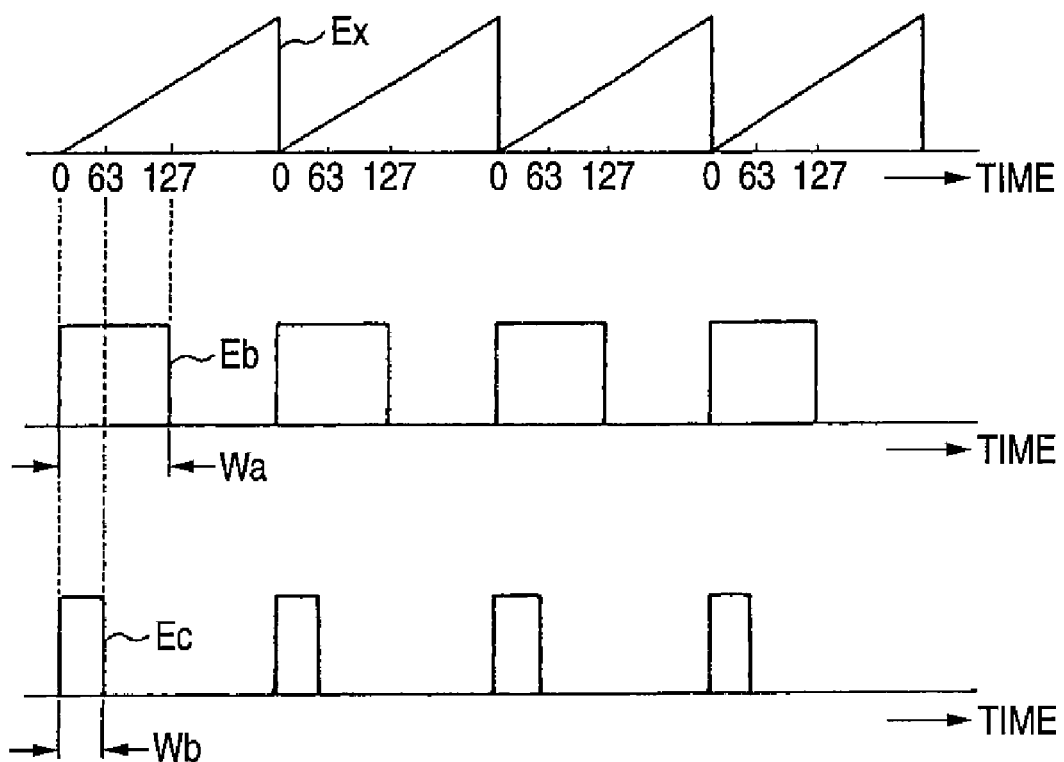
FIG. 16 is a time chart showing waveform examples obtained by the PWM controller.

As shown in FIG. 16, an output value Ea of the counter which repeats 0→the maximum value (255)→0→the maximum value→0 ... as described above. A waveform Eb of a signal output from the comparator, that is, the operation characteristic of the switching TFT when the gradation data are bit data No. 7 (gradation level 128). In this case, the switching TFT is turned ON with the output of the counter set within a range of 0 to 127, and the switching TFT is turned OFF with the output of the counter set within a range of 128 to 255.

A waveform Ec of a signal output from the comparator, that is, the operation characteristic of the switching TFT when the gradation data are bit data No. 6 (gradation level 64). In this case, the switching TFT is turned ON with the output of the counter set within a range of 0 to 63, and the switching TFT is turned OFF with the output of the counter set within a range of 64 to 255.

In FIG. 16, the waveform Eb has a pulse width Wa, and the waveform Ec has a pulse width Wb. More specifically, a duration for which the switching TFT is ON is varied corresponding to the volume of the gradation data so that the amount of a light emitted from the light emitter can be changed. Thus, the light emitter can be turned ON/OFF by the ON/OFF control of the switching TFT, thereby varying the amount of exposure to an image carrier. Consequently, it is possible to simplify the structure of the circuit.

As has been described heretofore, according to the invention, the data for the correction of a tilt are simply added by using the structure of the circuit which is originally required for the gradation control. Therefore, it is possible to correct the tilt of the line head with a simple structure. Moreover, it is possible to carry out the smoothing processing to eliminate the step of the tilt correction data, thereby forming a finer image.

Figure 19:
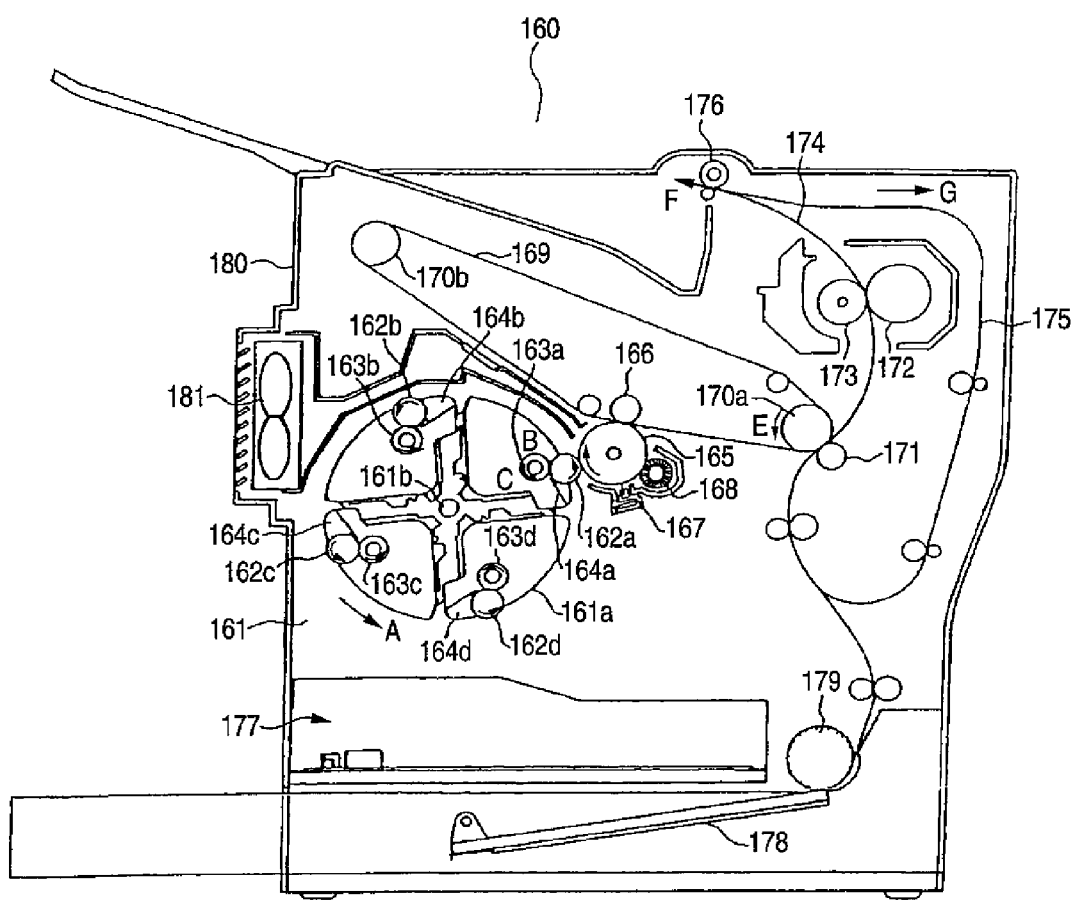
FIG. 19 is a schematic section view of a second example of an image forming apparatus incorporating the line head.

In the invention, it is a matter of course that the line head is also applied to a color printer using the tandem method and a 4-cycle color printer in addition to a monochromatic printer. Next, description will be given to an embodiment in which the 4-cycle color printer is used with reference to FIG. 19. An image forming apparatus 160 comprises a developing device 161 having a rotary structure, a photosensitive drum 165 serving as an image carrier, a line head 167 provided with an organic EL element, an intermediate transfer belt 169, a sheet transporting path 174, a heating roller 172 of a fuser unit, and a sheet feeding tray 178.

In the developing device 161, a developing rotary 161a is rotated in the direction of an arrow A around a shaft 161b. The inner part of the developing rotary 161a is divided into four image forming units of four colors of yellow (Y), cyan (C), magenta (M) and black (K). 162a to 162d denote developing rollers which are provided in the image forming units of the four colors and are rotated in the direction of an arrow B, and 163a to 163d denote toner supply rollers to be rotated in the direction of an arrow C. Moreover, 164a to 164d denote control blades for regulating a toner to have a predetermined thickness on the toner supply rollers.

166 denotes a primary transfer member, 168 denotes a charger, and 167 denotes an image writer which is constituted by a line head using an organic EL element. The photosensitive drum 165 is driven by a driving motor which is not shown, for example, a step motor in the direction of an arrow D which is reverse to the developing roller 162a.

The intermediate transfer belt 169 is laid between a follower roller 170b and a driving roller 170a, and the driving roller 170a is coupled to the driving motor of the photosensitive drum 165, thereby transmitting a power to the intermediate transfer belt 169. By the driving operation of the driving motor, the driving roller 170a of the intermediate transfer belt 169 is rotated in the direction of an arrow E which is reverse to the photosensitive drum 165. A detector for the test pattern for detecting the tilt of a line head can be provided in an arbitrary position opposing to the face of the intermediate transfer belt 169.

The sheet transporting path 174 is provided with a plurality of transporting rollers and a sheet ejecting roller pair 176 and serves to transport a recording sheet. An image (toner image) on either side carried on the intermediate transfer belt 169 is transferred onto either side of the recording sheet in the position of a secondary transfer roller 171. The secondary transfer roller 171 is retractably abutted on the intermediate transfer belt 169 so that the full color toner image is transferred onto the recording sheet when the secondary roller 171 is caused to abut on the intermediate transfer belt 169.

The recording sheet having the toner image transferred thereto as described above is then subjected to a fusing operation by the fuser unit. The fuser unit is provided with the heating roller 172 and a pressing roller 173. The recording sheet subjected to the fusing operation is drawn into the sheet ejection roller pair 176 to proceed in the direction of an arrow F. When the sheet ejection roller pair 176 is rotated in a reverse direction in this state, the direction of the recording sheet is inverted and the recording sheet proceeds along a sheet transporting path for double-sided printing 175 in the direction of an arrow G. 177 denotes an electrical equipment box, and 179 denotes a pickup roller provided on the outlet of the sheet feeding tray 178.

In the state shown in the drawing, a yellow (Y) electrostatic latent image is formed on the photosensitive drum 165 and a high voltage is applied to the developing roller 162a so that a yellow image is formed on the photosensitive drum 165. When the double-sided printing is performed, the developing rotary 161a is rotated at 90 degrees in the direction of the arrow A after yellow toner images for both sides of the recording sheet are transferred onto the intermediate transfer belt 169.

After a single circulation of the intermediate transfer belt 169, a cyan (C) toner image is on the photosensitive drum 165 and is superposed on the yellow toner image on the intermediate transfer belt 169. Subsequently, the rotation of 90 degrees of the developing rotary 161a and the above operations are repeated for the magenta (M) toner image and the black (K) toner image.

In order to transfer color images having four colors, the intermediate transfer belt 169 performs four circulations and the images are transferred onto the recording sheet in the position of the secondary transfer roller 171. A recording sheet fed from the sheet feeding tray 178 is transported along the sheet transporting path 174 and the color image is transferred onto either side of the recording sheet in the position of the secondary transfer roller 171. The recording sheet having the image transferred onto either side is inverted by the sheet ejection roller pair 176.

Thereafter, the recording sheet is transported to the position of the secondary transfer roller 171 in a proper timing so that the color image is transferred onto the other side of the recording sheet.

A housing 180 is provided with a ventilation fan 181.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A line head, comprising:
    a substrate;
    a plurality of first light emitters, operable to emit light so as to form an image and arrayed on the substrate along a first line extending in a first direction so as to form a light emitter array, each of the first light emitters having a first dimension in the first direction;
    a first driver, operable to drive the first light emitters; and
    a plurality of second light emitters, operable to emit light so as to form a test pattern that is different from the image formed by the plurality of first light emitters and that is used for detecting a tilt of the line head, and arrayed on the substrate along a second line extending in the first direction, each of the second light emitters having a second dimension in the first direction which is larger than the first dimension and a third dimension smaller than the first dimension in a second direction perpendicular to the first direction.

2. The line head as set forth in claim 1, wherein the first line and the second line situate different positions as to a second direction which is perpendicular to the first direction.

3. The line head as set forth in claim 1, wherein the first line and the second line situate an identical position as to a second direction which is perpendicular to the first direction.

4. The line head as set forth in claim 1, wherein the second light emitters are disposed in both end portions of the substrate in the first direction.

5. The line head as set forth in claim 1, wherein the second light emitters are disposed outside a region defined by lines extending in a second direction which is perpendicular to the first direction while passing through light emitters situated at both ends of the light emitter array.

6. The line head as set forth in claim 1, wherein the first light emitters include organic electroluminescence elements.

7. The line head as set forth in claim 1, wherein the first driver includes a thin film transistor circuit.

8. The line head as set forth in claim 1, wherein the first driver is operable to drive the second light emitters.

9. The line head as set forth in claim 1, further comprising a second driver operable to drive the second light emitters, the second driver being different from the first driver.

10. The line head as set forth in claim 1, wherein the substrate is a monolithically integrated body.

11. The line head as set forth in claim 10, wherein the second light emitters are disposed in both end portions of the monolithically integrated body in the first direction.

12. The line head as set forth in claim 1, wherein the first light emitter has a fourth dimension in a second direction which is perpendicular to the first direction, and the second emitter has the third dimension in the second direction that is smaller than the fourth dimension.

13. An image forming apparatus, comprising:
a line head, comprising:
a substrate;
a plurality of first light emitters, operable to emit light so as to form an image and arrayed on the substrate along a first line extending in a first direction so as to form a light emitter array, each of the first light emitters having a first dimension in the first direction;
a first driver, operable to drive the first light emitters; and
a plurality of second light emitters, operable to emit light so as to form a test pattern that is different from the image formed by the plurality of first light emitters and that is used for detecting a tilt of the line head, and arrayed on the substrate along a second line extending in the first direction, each of the second light emitters having a second dimension in the first direction which is larger than the first dimension;
an image carrier, adapted to move in the second direction so that a first electrostatic latent image is formed thereon by light emitted from the first light emitters and a second electrostatic latent image is formed thereon by light emitted from the second light emitters;
a developing device, operable to supply toner onto the image carrier to develop the first electrostatic latent image as the image and to develop the second electrostatic latent image as the test pattern; and
a detector, operable to detect a deviation of a position of the test pattern from a reference position to determine a tilt of the line head from a reference attitude,
wherein each of the second light emitters has a third dimension smaller than the first dimension in a second direction perpendicular to the first direction.

14. The image forming apparatus as set forth in claim 13, further comprising a controller operable to delay an emission start timing of at least one of the first light emitters in accordance with the determined tilt.

15. The image forming apparatus as set forth in claim 14, wherein:
the light emitter array is divided into a plurality of blocks each including a plurality of the first light emitters; and
the controller collectively controls the emission start timing for the first light emitters in each of the blocks.

16. The image forming apparatus as set forth in claim 15, wherein the emission start timings of first light emitters situating in the vicinity of a border between adjacent ones of the blocks are subjected to processing to reduce a difference between the emission start timings thereof.

17. The image forming apparatus according to claim 13, further comprising:
a memory, configured to store a detected result of the tilt.

18. A method for determining a tilt of a line head of an image forming apparatus, the method comprising:
providing a line head comprising;
a substrate;
a plurality of first light emitters, operable to emit light so as to form an image and arranged on the substrate along a first line extending in a first direction so as to form a light emitter array, each of the first light emitters having a first dimension in the first direction; and
a plurality of second light emitters, operable to emit light so as to form a test pattern that is different from the image formed by the plurality of first light emitters, and arrayed on the substrate along a second line extending in the first direction, each of the second light emitters having a second dimension in the first direction which is larger than the first dimension and a third dimension which is smaller than the first dimension in a second direction perpendicular to the first direction;
emitting light from the second light emitters to form an electrostatic latent image;
supplying toner to develop the electrostatic latent image as the test pattern; and
detecting a deviation of a position of the test pattern from a reference position to determine a tilt of the line head from a reference attitude.

* * * * *